(12) United States Patent
Chen et al.

(10) Patent No.: US 12,524,631 B1
(45) Date of Patent: Jan. 13, 2026

(54) CONTACT CHIP READER SUPPORT FOR NFC-ENABLED DEVICES

(71) Applicant: Visa International Service Association, San Francisco, CA (US)

(72) Inventors: Yuexi Chen, Foster City, CA (US); Mustafa Top, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/811,344

(22) Filed: Aug. 21, 2024

(51) Int. Cl.
*G06K 7/10* (2006.01)
*G06Q 20/32* (2012.01)

(52) U.S. Cl.
CPC ..... *G06K 7/10297* (2013.01); *G06Q 20/3278* (2013.01)

(58) Field of Classification Search
CPC .............. G06K 7/10297; G06Q 20/3278
See application file for complete search history.

(56) References Cited

U.S. PATENT DOCUMENTS 9,608,327 B1   3/2017   Tai et al.
9,773,241 B2   9/2017   Yang et al.

FOREIGN PATENT DOCUMENTS

EP    4113361 A1 *  1/2023   ......... G06K 7/10178
WO   2023/104208 A1   6/2023
WO   2023/131609 A1   7/2023

OTHER PUBLICATIONS

Ram® NFC Extender, downloaded from the internet on Aug. 15, 2023, from RAM Mounts website at https://rammount.com/products/ram-gds-cab-nfcu (2 pages).

* cited by examiner

*Primary Examiner* — Kristy A Haupt
(74) *Attorney, Agent, or Firm* — Kilpatrick Townsend & Stockton LLP

(57) ABSTRACT

A method is disclosed and includes communicating, by a bridge apparatus comprising a controller via a contact interface in the bridge apparatus, with a portable device. The method also includes transmitting, by a first antenna of the bridge apparatus, a wireless signal comprising a contact protocol indicator to a second antenna of a user device. The method also includes receiving, by the bridge apparatus via the first antenna, a contact command in a contactless protocol. The method also includes converting, by the controller in the bridge apparatus, the contact command to a contact protocol. The method also includes providing, by the controller in the bridge apparatus, the contact command in the contact protocol to the portable device via the contact interface.

20 Claims, 7 Drawing Sheets

CONTACT CHIP READER SUPPORT FOR NFC-ENABLED DEVICES

BACKGROUND

Contactless (e.g., NFC) transactions provide convenience and efficiency. However, having both contactless and contact transaction options may be desirable to provide flexibility and other benefits. For example, a user device such as a mobile phone may be capable of interacting with a portable device such as an access card in a contactless mode, but not a contact mode. Because the user device cannot interact with the portable device in a contact mode, its usefulness is limited. It would be desirable to expand the capabilities of conventional user devices.

Embodiments of the invention address these and other problems individually and collectively.

BRIEF SUMMARY

One embodiment is related to a method comprising: communicating, by a bridge apparatus comprising a controller via a contact interface in the bridge apparatus, with a portable device; transmitting, by a first antenna of the bridge apparatus, a wireless signal comprising a contact protocol indicator to a second antenna of a user device; receiving, by the bridge apparatus via the first antenna, a contact command in a contactless protocol; converting, by the controller in the bridge apparatus, the contact command to a contact protocol; and providing, by the controller in the bridge apparatus, the contact command in the contact protocol to the portable device via the contact interface.

Another embodiment is related to a bridge apparatus comprising: a first antenna; a contact interface; a controller electrically coupling the first antenna and the contact interface, wherein the bridge apparatus is configured to perform operations comprising: communicating, by the controller via the contact interface, with a portable device; transmitting, by a first antenna, a wireless signal comprising a contact protocol indicator to a second antenna of a user device; receiving, by the controller via the first antenna via a contactless protocol, a contact command; converting, by the controller, the contact command to a contact protocol; and providing, by the controller, the contact command in the contact protocol to the portable device via the contact interface.

Another embodiment is related to a system comprising: a bridge apparatus, comprising a first antenna, a controller, and a contact interface; a user device, comprising a processor, and a second antenna; and a portable device; wherein the bridge apparatus is configured to perform operations comprising: communicating, by the controller via the contact interface, with a portable device; transmitting, by a first antenna, a wireless signal comprising a contact protocol indicator to a second antenna of a user device; receiving, by the controller via the first antenna via a contactless protocol, a contact command; converting, by the controller, the contact command to a contact protocol; and providing, by the controller, the contact command in the contact protocol to the portable device via the contact interface.

Further details regarding embodiments of the disclosure can be found in the Detailed Description and the Figures.

DETAILED DESCRIPTION

Figure 1:
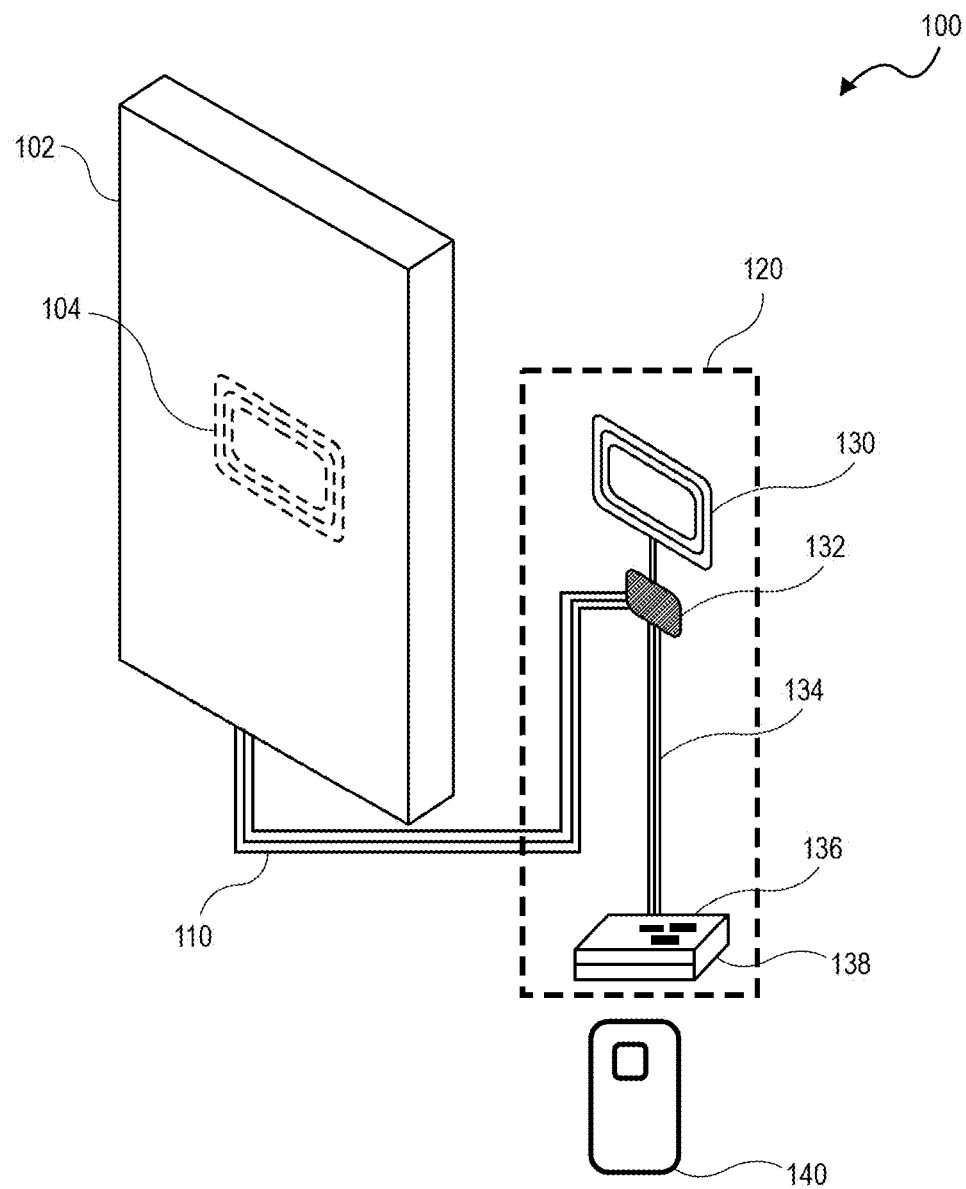
FIG. 1 is a block diagram illustrating an example communication system, according to certain embodiments.

Prior to discussing embodiments of the disclosure, some terms can be described in further detail.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 4G, 5G or similar networks), Wi-Fi, Wi-Max, or any other communication medium that may provide access to a network such as the Internet or a private network.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "resource provider" may be an entity that can provide a resource such as goods, services, information, and/or access. Examples of resource providers includes merchants, data providers, transit agencies, governmental entities, venue, and dwelling operators, etc.

A "portable device" can be a device that is easily transportable. In some cases, it can be hand-held and compact. For example, a portable device may fit into a user's wallet and/or pocket (e.g., pocket-sized). Some exemplary portable devices may include smart cards, ordinary credit or debit cards (with a magnetic strip), keychain devices, etc. Other examples of portable devices include cellular phones, personal digital assistants (PDAs), pagers, payment cards, security cards, access cards, smart media, transponders, vehicles (e.g., cars, boats, motorcycles, etc.), wearable devices (e.g., smart watch, smart jewelry, smart clothing, etc.) and the like. The portable devices can also be debit devices (e.g., a debit card), credit devices (e.g., a credit card), or stored value devices (e.g., a stored value card).

An "antenna" can include a device used to transmit and/or receive signals. An antenna can be a rod, a wire, a chip, a chipset, etc. that is capable of receiving and/or transmitting radio signals. An antenna can be a near-field communication antenna, an ultra-wideband antenna, or any other suitable type of antenna.

A "near-field communication antenna" can include a device used to transmit and/or receive near-field communication based signals. A near-field communication antenna can be a chip or a chipset that enables short-range wireless communication between two devices. A near-field communication antenna can be a near-field communication reader chip (e.g., active component) or a near-field communication tag (e.g., passive component). A near-field communication antenna that is a near-field communication reader chip can provide power and can send near-field communication commands to a near-field communication tag. Near-field communication is based on inductive coupling between two antennas present on two devices (e.g., on a user device and on an access device). The two devices can communicate in one or both directions, using a frequency of 13.56 MHz in the globally available unlicensed radio frequency ISM band using the ISO/IEC 14443 air interface standard at data rates ranging from 106 to 848 kbit/s.

"A coil" can include a length of something wound or arranged in a spiral or other looping shape. A coil can be a coil of wire. A coil can include loops of an electrically conductive material. A coil can flattened into a single plane or can have depth similar to a solenoid.

"Modulation" can include alteration of the amplitude or the frequency of an electromagnetic wave or other oscillation in accordance with the variations of a second signal. Modulation can be the process of varying one or more properties of a periodic waveform, called the carrier signal, with a separate signal called the modulation signal that typically contains information to be transmitted. The carrier signal can be demodulated to extract the information bearing modulation signal.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron, and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "decoder" may be a device that interprets incoming messages from a communication protocol format. It may analyze the structure (e.g., protocol-specific headers, data fields, and metadata) and message content, extracting the relevant data (e.g., payload or meaningful information) according to the rules of the source protocol.

An "encoder" may be a device that packages data into a format compatible with a target communication protocol. It may structure the data according to the target protocol's specifications, such as adding appropriate headers and metadata, applying any encoding or compression required by the target protocol to the appropriate format.

Near-field communication (NFC) is a short-range two way wireless communication technology that uses magnetic-field induction to enable communications between electronic devices in close proximity. An NFC-capable device is configured with a coil-loop antenna, through which an electric current is passed to generate a magnetic field that surrounds the conductor forming the coil-loop. A change in the magnetic field in the vicinity of the antenna induces a change in voltage across the terminals of the coil-loop, and a change in voltage across the terminals of the coil-loop changes the magnetic field generated by the antenna. By modulating the magnetic field generated between the inductively-coupled coil-loop antennae, data is transferred between devices.

User devices can be used to accept contactless interactions (e.g., contactless payment transactions) using near-field communication (NFC) reader capabilities (e.g., tap to phone). However, there are circumstances in which contact interactions (e.g., inserting an EMV integrated circuit (IC) card into a card reader) may be required. For example, some smart card issuers may require cardholders to use contact IC cards to verify offline pins (or additional PIN entries) for enhanced security to complete transactions. In another example, certain countries may have regulations requiring contact interactions as a fallback in addition to contactless interactions. In some instances, contact interactions can be a reliable backup in case unexpected card reader problems or customer device malfunctions occur. Thus, there is a need to address these challenges and others.

Embodiments described herein address these and other problems by enabling a user device capable of performing contactless interactions to accept contact payment transactions without installing additional software applications on the user device. Such solution provides a number of advantages/benefits, such as avoiding hardware and software compatibility issues.

The disclosed techniques provide a bridge apparatus that enables communication between a user device (e.g., a commercially available smartphone with built-in NFC capabilities for contactless payment transactions) capable of performing contactless interactions to accept contact payment transactions from a portable device (e.g., an EMV IC card or called a contact IC card). The bridge apparatus may include an NFC antenna (an example of a first NFC antenna), a conversion circuit, and a contact interface. The first NFC antenna of the bridge apparatus may be used to communicate with an NFC antenna (an example of a second NFC antenna) of the user device using a wireless signal. The user device can include an interaction application (e.g., a tap-to-phone acceptance application) that can facilitate a user performing an interaction (e.g., a contactless payment transaction, a data transfer, etc.). The contact interface (e.g., a contact IC card reader, also referred to as a contact chip card reader) of the bridge apparatus may be used to communicate with the portable device.

The bridge apparatus may include a controller in the conversion circuit configured to perform an NFC card emulation to interact with the user device (e.g., acting as an NFC reader). The bridge apparatus may transmit, by its NFC antenna (or the first NFC antenna), a wireless signal comprising a contact protocol indicator to the NFC antenna (or the second NFC antenna) of the user device to notify the user device that a conversion between a contactless protocol (e.g., ISO 14443) and a contact protocol (e.g., ISO 7816) may be performed by the conversion circuit of the bridge apparatus.

Upon receiving the contact protocol indicator, the interaction application of the user device may generate an interaction command message for a contact transaction, such as a contact command (e.g., contact APDU command). The contact command may be modulated and transmitted in the contactless protocol (e.g., ISO 14443 format) to the bridge apparatus, via the first NFC antenna and the second NFC antenna. After receiving the contact command in the contactless protocol, the conversion circuit of the bridge apparatus may demodulate and convert the contact command to the contact protocol (e.g., ISO 7816 format), and provide the contact command in the contact protocol to the portable device via the contact interface.

In some embodiments, the bridge apparatus may receive an interaction response message for a contact transaction, such as a contact response (e.g., contact APDU response) from the portable device via the contact interface. After receiving the contact response in the contact protocol, the conversion circuit of the bridge apparatus may convert the contact response to the contactless protocol, modulate and transmit the contact response to the user device via the first antenna and the second antenna.

ISO 14443 refers to an international standard designed for proximity or contactless card communication. The standard describes physical characteristics, radio frequency, signal interface, initialization and anti-collision, and transmission protocol. ISO 7816 refers to an international standard designed for cards (e.g., EMV IC cards) that require physical contact with a card reader. The standard describes the physical characteristics, electrical interface, and transmission protocols for a contact IC card (e.g., EMV contact IC card). An interaction message (either a command or a response) may be transmitted or received in either contactless protocol (e.g., ISO 14443 format) or contact protocol (e.g., ISO 7816 format), depending on the type of transmission medium (e.g., wireless or wired).

FIG. 1 is a block diagram illustrating an example communication system 100, according to certain embodiments. The communication system 100 depicted in FIG. 1 is an example and is not intended to unduly limit the scope of claimed embodiments. Many variations, alternatives, and modifications are possible. For example, in some implementations, communication system 100 may have more or fewer components than those shown in FIG. 1, may combine two or more components, or may have a different configuration or arrangement of components. The system, subsystems, and other components depicted in FIG. 1 may be implemented in software (e.g., code, instructions, program) executed by one or more processing units (e.g., processors, cores) of the system, using hardware, or combinations thereof. The software may be stored on a non-transitory storage medium (e.g., on a memory device).

The communication system 100 comprises a user device 102, a bridge apparatus 120, a portable device 140, and a power supply cable 110.

The user device 102 can be a smartphone. In some embodiments, the user device 102 can be operated by a resource provider that provides resources. The user device 102 can include a user device NFC antenna 104 (referred to as the second NFC antenna). The user device 102 can include an interaction application (and its kernel) that can facilitate in a user performing an interaction (e.g., a contactless payment transaction, a data transfer, etc.).

The bridge apparatus 120 comprises an NFC antenna coil 130 (which can be the first NFC antenna), a conversion circuit 132, and a contact interface 136. The components of the bridge apparatus 120 can be embedded in a substrate. The bridge apparatus 120 can receive and transmit NFC signals to and from the user device 102. The bridge apparatus 120 can receive and transmit wired signals to and from the portable device 140.

The wireless signal transmission between NFC antennas (the first and the second NFC antennas) can occur through magnetic induction. For example, the user device 102 can excite current at approximately 13.56 MHz through the user device's NFC antenna. This induces a magnetic field, which further (via mutual coupling) induces an electric current in the bridge apparatus' NFC antenna 130 when they are closely placed. The wireless signal (e.g., NFC signal) may be modulated and demodulated during transmission between two NFC antennas. For example, the wireless signal may be modulated (e.g., into a radio frequency (RF) carrier signal of 13.56 MHz to form a modulated interaction signal) before being transmitted by the user device NFC antenna 104 and demodulated after being received by the bridge apparatus NFC antenna 130.

The portable device 140 can be a card, such as a debit card, a credit card, etc. For example, the portable device 140 can be a Europay, Mastercard, and Visa (EMV) card that contains an integrated circuit that encrypts transaction data uniquely for each payment. The portable device 140 may be inserted into a receiving end 138 (e.g., a card slot) of the contact interface 136 (e.g., a contact card reader), and communicate with the conversion circuit 132 of the bridge apparatus 120 via contact reader wire 134.

The power supply cable 110 can include electrical components capable of transferring electricity. The power supply cable 110 can provide power to the bridge apparatus 120. The power supply cable 110 can electrically couple the bridge apparatus 120 and the user device 102. The power supply cable 110 can obtain power from a power supply in the user device 102. In some embodiments, the power supply cable 110 may not be connected to the user device 102 and can rather be connected to an external power supply (e.g., a battery pack, etc.). The power supply cable 110 can provide a 3.3 V, 5 V, etc. voltage supply.

Figure 2:
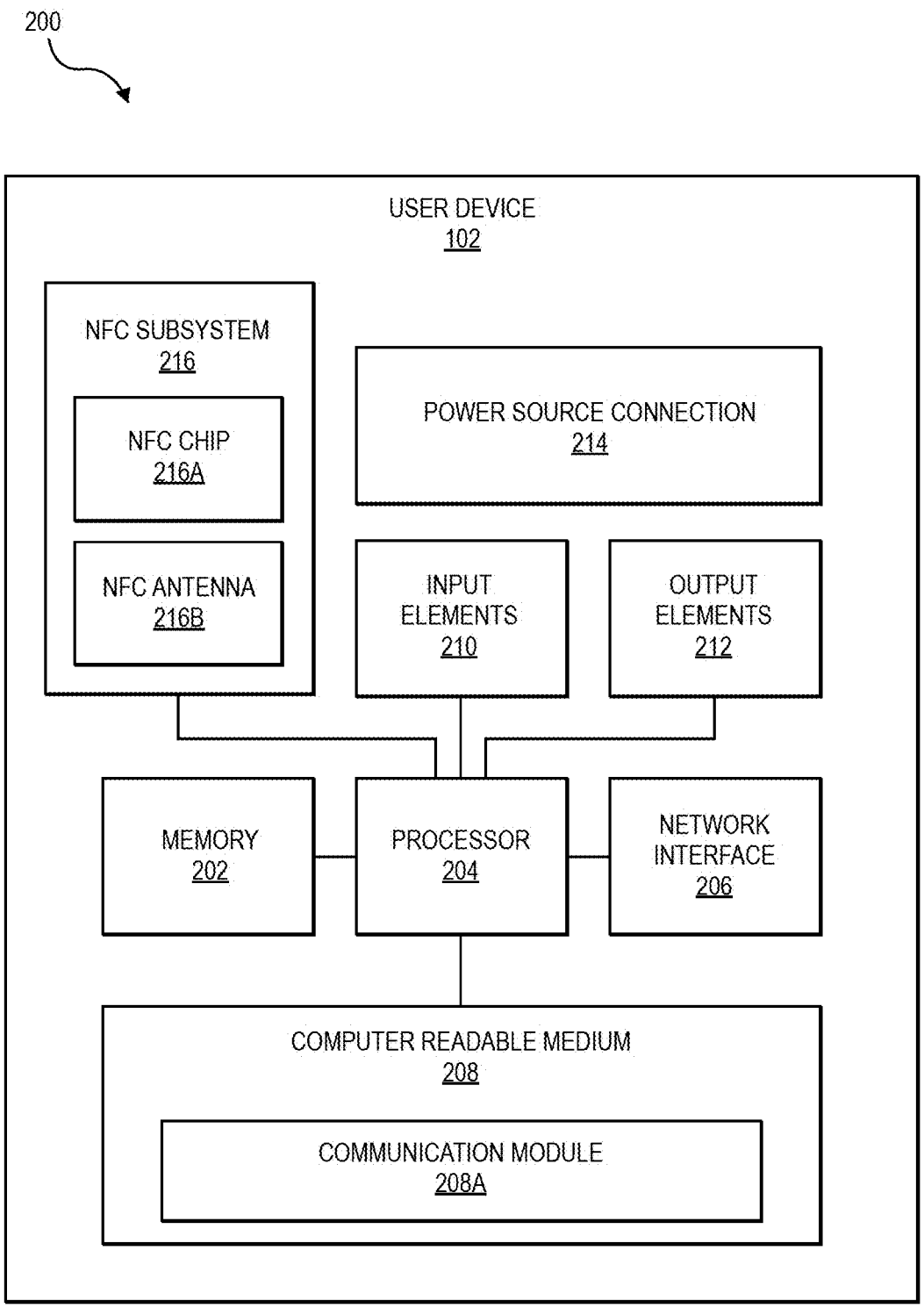
FIG. 2 is a block diagram illustrating an example user device, according to certain embodiments.

FIG. 2 is a block diagram illustrating an example user device 102, according to certain embodiments.

The example user device 102 may comprise a processor 204. The processor 204 may be coupled to a memory 202, a network interface 206, a computer readable medium 208, input elements 210, output elements 212, a power source connection 214, and an NFC subsystem 216. The computer readable medium 208 can comprise one or more modules including the communication module 208A.

The memory 202 can be used to store data and code. For example, the memory 202 can store interaction data, APDU commands, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The input elements 210 may include any suitable device(s) capable of inputting data into the user device 102. Examples of input elements 210 include buttons, touchscreens, touch pads, microphones, etc.

The output elements 212 may comprise any suitable device(s) that may output data. Examples of output elements 212 may include display screens, speakers, and data transmission devices. For example, the output elements 212 can include a display screen capable of displaying a response value to a user of the user device 102.

The computer-readable medium 208 may comprise code, executable by the processor 204, for performing methods.

The communication module 208A allows the processor 204 to control the NFC subsystem 216, which includes the NFC chip 216A and the NFC antenna 216B, which is tuned typically for 13.56 MHz. The NFC chip 216A could be, for example, a PN531 microcontroller-based transmission module from the Phillips Semiconductor Branch of Koninklijke Phillips Electronics N.V.

The network interface 206 may include an interface that can allow the user device 102 to communicate with external computers. Some examples of the network interface 206 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 206 may include Wi-Fi™. Data transferred via the network interface 206 may be in the form of signals, which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used, such as, for instance, a wire or cable, fiber optics, a telephone line, a cellular link, a radio frequency (RF) link, a WAN or LAN network, the Internet, or any other suitable medium.

The NFC subsystem 216 can include an NFC chip 216A and an NFC antenna 216B. The communication module 208A, in conjunction with the processor 204, can cooperate with the NFC subsystem 216 to communicate using NFC.

The NFC antenna 216B can include an antenna configured to utilize near-field communication frequencies. Near-field communication can include a set of communication protocols that enable communication between two electronic devices over a distance of 4 cm or less. Near-field communication is based on inductive coupling between two antennas present on near-field communication-enabled devices communicating in one or both directions, using a frequency of 13.56 MHz in the globally available unlicensed radio frequency ISM band using the ISO/IEC 14443 air interface standard at data rates ranging from 106 to 848 kbit/s.

The NFC antenna 216B can be connected to an interface and connected to driver circuits. The interface and the driver circuits can connect the near-field communication antenna to the processor 204.

The power source connection 214 can both provide power and receive power from connected devices. In some embodiments, the power source connection 214 can be electrically coupled to the power supply cable 110, which can be electrically coupled to the bridge apparatus 120. As such, the power source connection 214 can provide electricity to the bridge apparatus 120.

An interaction application (e.g., a tap-to-phone application) may comprise a kernel software including codes running on the processor 204 to cause the user device 102 to receive data from and transmit data (e.g., via the NFC subsystem 216 and an NFC API) to an external device such as an external card.

In some embodiments, the interaction application can generate interaction command messages (e.g., APDU commands) and receive interaction response messages (e.g., APDU responses). The APDU commands may include both contactless APDU commands and contact APDU commands. The interaction application may be configured to generate either contactless APDU commands or contact APDU commands based on an indicator (discussed below) received by the interaction application.

Figure 3:
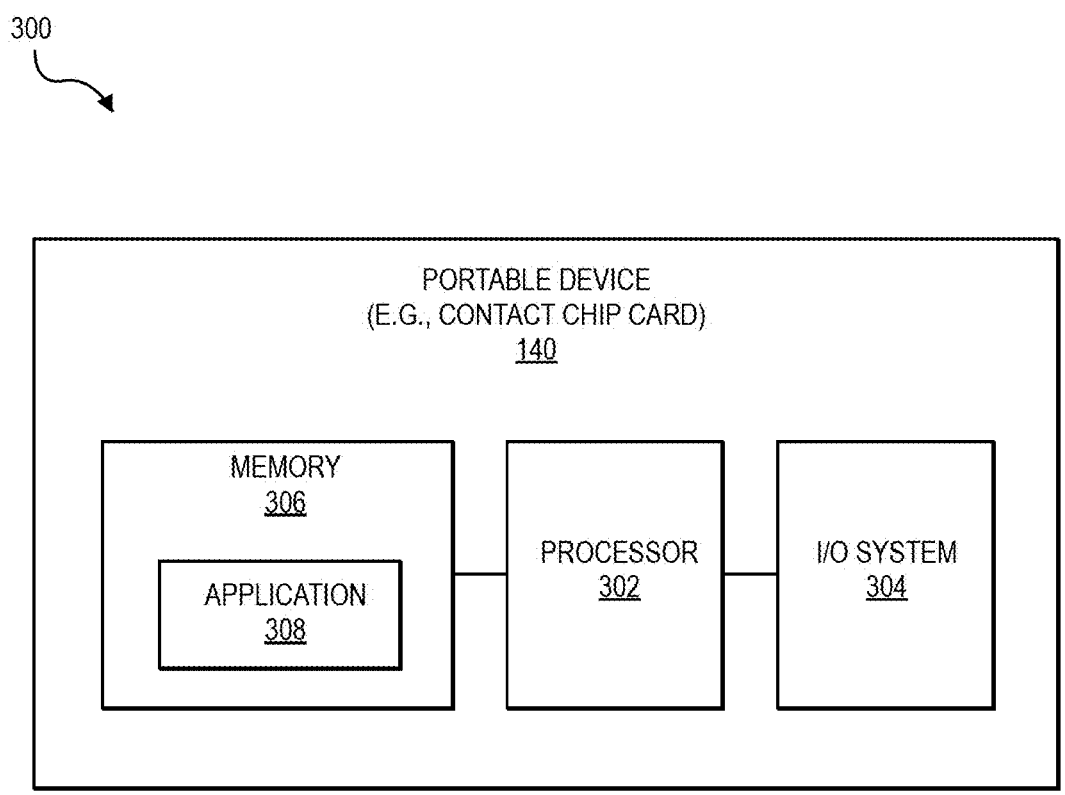
FIG. 3 is a block diagram illustrating an example portable device, according to certain embodiments.

FIG. 3 is a block diagram illustrating an example portable device, according to certain embodiments. The example portable device 140 depicted in FIG. 3 is an example and is not intended to unduly limit the scope of claimed embodiments. Many variations, alternatives, and modifications are possible.

The portable device 140 can be an integrated circuit (IC) card. The portable device 140 may include a processor 302, a memory 306 storing a plurality of applications (e.g., application 308) executable by the processor 302, and an I/O system 304.

The processor 302 can be implemented as one or more integrated circuits (e.g., one or more single core or multicore microprocessors and/or microcontrollers), and is used to control the operation of the portable device 140. The processor 302 can execute a variety of applications using the application code or computer-readable code stored in the memory 306, and may maintain multiple concurrently executing applications or processes in some embodiments.

The memory 306 can be implemented using any combination of any number of non-volatile memories (e.g., flash memory, EEPROM) and volatile memories (e.g., DRAM, SRAM), or other suitable non-transitory storage medium, or a combination thereof media. The memory 306 may store various applications, including the application 308, that can be selected by a client device (e.g., the user device 102) for data exchange. Examples of such applications may include mobile wallet applications, interaction applications, resource provider applications, identification applications, etc. An interaction application can include transit applications, secure location access applications, payment applications, and/or any other suitable application facilitating interaction between two entities (e.g., a user and a resource provider). In some embodiments, an interaction application can be provisioned by an authorizing entity. As an example, the application 308 can be a payment application that can allow a user of the portable device 140 to gain access to a resource (e.g., goods and/or services purchased using the payment application).

The I/O system 304 can include a contact area, such as a pattern of contact pads (e.g., approximately one square centimeter in size), that provides electrical connectivity when inserted into a contact card reader (e.g., 136) for signal transmission.

Figure 4:
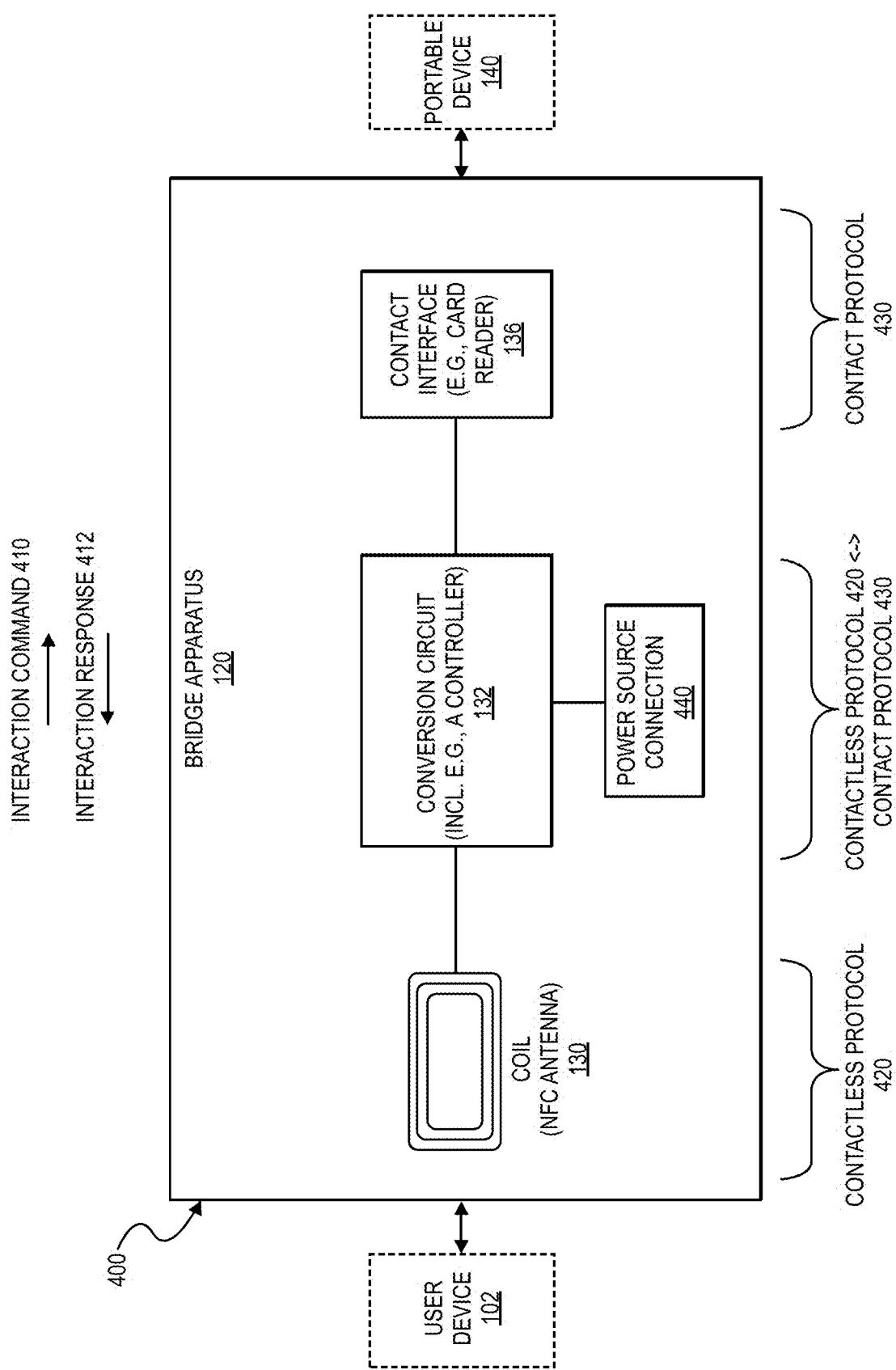
FIG. 4 is a block diagram illustrating an example bridge apparatus, according to certain embodiments.

FIG. 4 is a block diagram illustrating an example bridge apparatus 120, according to certain embodiments. As discussed earlier in relation to FIG. 1, the bridge apparatus 120 comprises an NFC antenna 130, a conversion circuit 132, a contact interface 136, and a power source connection 110. The bridge apparatus 120 can include a substrate 400 in which the aforementioned electrical components may be integrated.

The NFC coil 130 (or a coil-loop antenna) can include a circular, ovular, rectangular, or other shape of coiled conductive material, and can transmit or receive modulated radio frequency (RF) carrier signal (also referred to as NFC signal).

The conversion circuit 132 can perform modulation/demodulation of the NFC signal, and protocol conversion (e.g., through decoding and encoding) between a contactless protocol (e.g., ISO/IEC 14443 or abbreviated as ISO 14443) and a contact protocol (e.g., ISO/IEC 7816 or abbreviated as ISO 7816) for an interaction message (e.g., APDU command or response).

For example, the bridge apparatus 120 may receive an interaction command message 410 (e.g., contact APDU command) in contactless protocol 420 (e.g., ISO/IEC 14443 format) via NFC antenna 130 from the user device 102. The conversion circuit 132 can convert the interaction command 410 from contactless protocol 420 to contact protocol 430 (e.g., ISO 7816 format). The conversion circuit 132 can then send the interaction command 410 in contact protocol 430 to the portable device 140 via the contact interface 136.

On the other hand, the bridge apparatus 120 may receive an interaction response message 412 (e.g., contact APDU response) in contact protocol 430 (e.g., ISO 7816 format) from the portable device 140 via the contact interface 136. The conversion circuit 132 can convert the interaction response 412 from contact protocol 430 to contactless protocol 420. The conversion circuit 132 can then send the interaction response 412 in contactless protocol 420 to the user device 102 via NFC antenna 130. Further details describing the conversion circuit are described below in FIG. 5.

The contact interface 136 (e.g., a contact IC card reader) can include a processor (or a microcontroller), various types of memories, and a receiving end or card interface (138, e.g., a card slot as the physical interface for card insertion). The processor may process data, execute contact commands, etc. In some embodiments, a secure crypto processor may be used for secured communication between the portable device 140 (e.g., contact IC card) and the contact interface 136. The contact interface may be ISO 7816 compliant.

The power source connection 440 can supply power to the conversion circuit 132. In some embodiments, the power source connection 440 can be electrically coupled to the power supply cable 110, which can be electrically coupled to the user device 102. As such, the power source connection 440 can receive electricity from the user device 102. In other embodiments, the power source connection 440 can be electrically coupled to a battery or other suitable power source.

Figure 5:
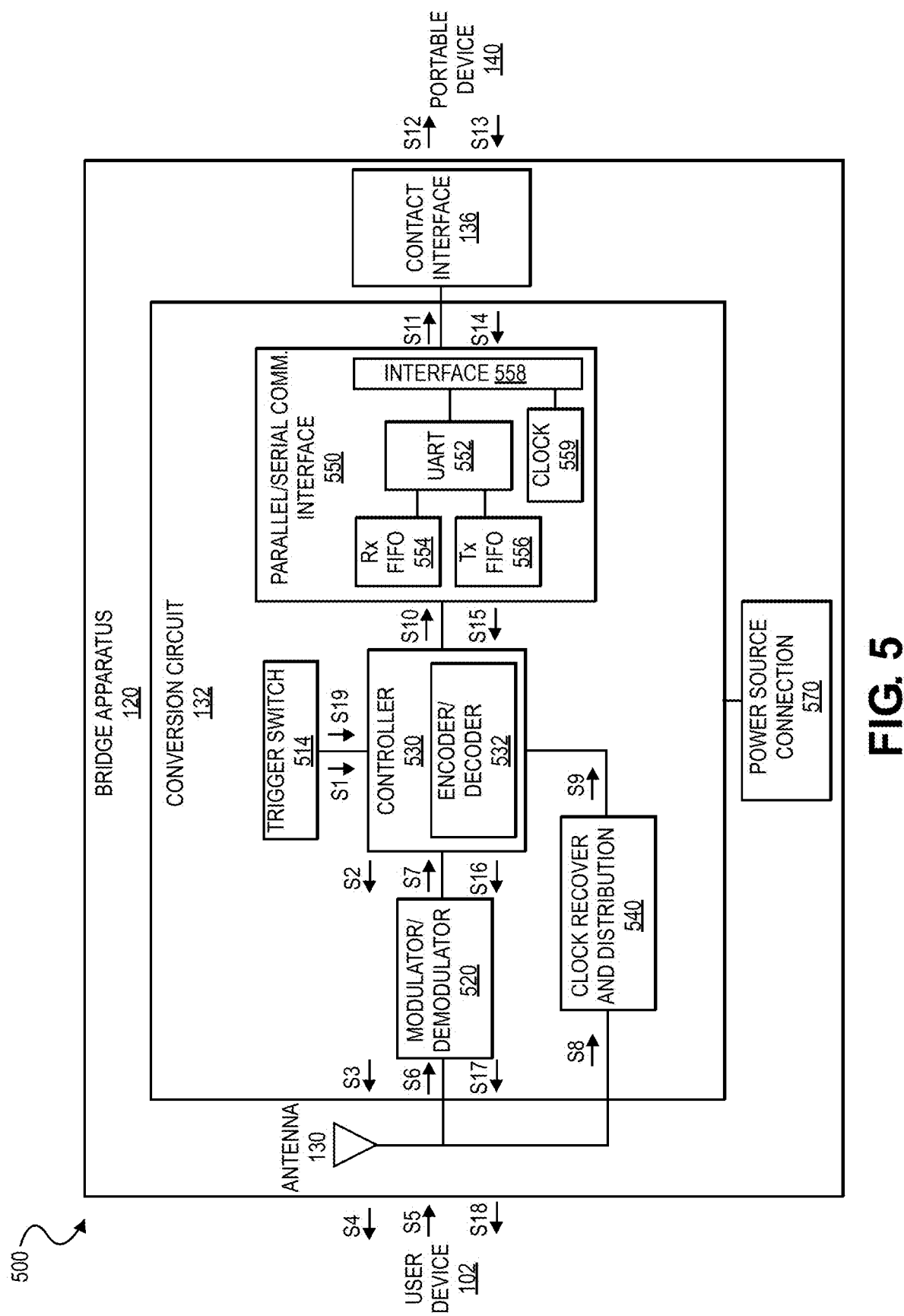
FIG. 5 is a block diagram illustrating a communication method for a bridge apparatus, according to certain embodiments.

FIG. 5 is a block diagram illustrating a communication method for a bridge apparatus, according to certain embodiments. The method illustrated in FIG. 5 may be described in the context of a first user of the user device 102 being a resource provider that is offering resources to a second user of the portable device 140.

As discussed above, the bridge apparatus 120 may include a conversion circuit 132 for performing protocol conversion between a contactless protocol (e.g., ISO 14443) and a contact protocol (e.g., ISO 7816) for an interaction message (e.g., APDU command or response). The interaction messages can be command-response pairs for facilitating contact IC card transaction (referred to herein as contact interaction messages, such as contact APDU command-response pairs), and command-response pairs for facilitating contactless/NFC card (referred to herein as contactless interaction messages, such as contactless APDU command-response pairs). These two types of interaction messages may have similar structure, but one type (e.g., contactless APDU messages) may involve additional encapsulation and optimizations to facilitate faster, more efficient transactions in the contactless environment than another type (e.g., contact APDU messages).

In FIG. 5, the conversion circuit 132 comprises a trigger switch 514, a modulator/demodulator 520, a clock recovery and distribution module 540, a controller 530, which may include an encoder/decoder module 532, and a parallel/serial communication interface module 550. In some embodiments, the encoder/decoder module 532 may be separated from but controlled by the controller 530.

The modulator/demodulator 520, which may include a modulator and demodulator, can demodulate an NFC signal (e.g., a modulated interaction message) received by an NFC antenna (e.g., 130) and modulate a signal (e.g., an interaction message) for transmitting by the NFC antenna (e.g., 130). In some embodiments, a signal may be modulated using amplitude shift keying (ASK) for communication from an NFC reader (e.g., user device 102) to an NFC card (e.g., bridge apparatus 120 performing NFC card emulation). ASK may be a form of amplitude modulation that represents digital data as variations in the amplitude of the carrier wave. In other embodiments, a signal may be modulated using binary phase shift keying (BPSK) for communication from an NFC card to an NFC reader. BPSK may use two phases of a carrier signal to represent binary data.

The clock recovery and distribution module 540 may include a clock extractor, a frequency divider, and a counter. The clock extractor may recover timing information from the received signal to synchronize the receiver with the incoming data, such that synchronization between data and clock can be maintained. A frequency divider may be used to handle different data rates (e.g., NFC data rates for 106 kbps, 212 kbps, and 424 kbps) by generating multiple related clock speeds from a single input. A counter may be used to track the received information (e.g., the number of received bits or frames) or implement timing functions for protocol-specific requirements.

The encoder/decoder module 532, which may include an encoder and a decoder, can interpret the data structure of a received interaction message in one format, and perform protocol translation or mapping to reformat the interpreted information to fit another protocol format. For example, a decoder may decode an encoded signal after demodulation to obtain a received interaction message (e.g., APDU command/response) in one protocol format (e.g., contactless/contact protocol). An encoder may then encode the same interaction message using a certain encoding scheme to fit another protocol format, such as a modified Miller coding and/or Manchester coding for contactless protocol (e.g., ISO 14443), and Basic Encoding Rules-Tag-Length-Value (BER-TV) encoding for contact protocol (e.g., ISO 7816).

The parallel/serial communication interface 550 may include a universal asynchronous receiver-transmitter (UART) 552, a receive FIFO (Rx FIFO) 554, a transmit FIFO (Tx FIFO) 556, and an interface 558 for serial data transfer (e.g., according to ISO 7816 standard) connected to the contact interface 136. The parallel/serial communication interface 550 may receive data in a parallel form from the controller 530 and convert it into serial form for transmission (to contact interface 136), and convert received serial data back to the parallel form in the reverse direction. The UART 552 may enable asynchronous data exchange between two electronic devices with different clock rates, where both electronic devices may agree on a specific baud rate that represents the number of bits transmitted per second. The Rx FIFO 554 and Tx FIFO 556 may temporarily buffer data for processing by the UART.

In some embodiments, the parallel/serial communication interface 550 may be controlled by the controller 530 to perform ISO 7816 character modulation (e.g., data is transmitted as 10-bit characters, including a start bit, 8 data bits, and a parity bit), card activation, and answer to reset (ATR). The card activation may involve powering up and initializing communication with the portable device 140 (e.g., contact IC card) by applying VCC power and starting clock 559. ATR may be a sequence of electrical signals for conveying information about communication parameters between the contact interface 136 (e.g., a contact IC card reader) and the portable device 140 (e.g., a contact IC card). In certain embodiments, the transmission between the UART 552 and the interface 558 may have a single I/O wire controlled by three other wires: VCC power, reset (RST) and clock (CLK).

The communication process may commence at step S1. The portable device 140 may be inserted into the receiving end 138 (e.g., a card slot) of the contact interface 136 (e.g., a contact card reader). The trigger switch 514 for card insert detection may be automatically pressed, notifying the controller 530 to enable the parallel/serial communication interface 550 to perform card activation and answer to reset (ATR) between the contact interface 136 and the portable device 140.

Prior to step S2, the controller 530, after receiving the notification from the trigger switch 514, may also perform NFC card emulation, which may be similar to an NFC card (or contactless card) tapped on the user device 102. As a result, the NFC antenna 104 of the user device 102 may detect the NFC card emulation, and the interaction application (e.g., a tap-to-phone application) and NFC API of the user device 102 can initiate an interaction, and establish the NFC communication between the user device 102 and the bridge apparatus 120, as part of the NFC card initialization process.

At step S2, during the NFC card initialization process, the controller 530 may generate and send a contact protocol indicator to the user device 102, indicating that the bridge apparatus 120 will be performing a contactless-to-contact protocol conversion for the portable device 140 that is capable of conducting a contact transaction. For example, the contact protocol indicator may be a code or number that is not used by any contactless card. Or it can be an agreed indication the interaction application of the user device 102 has been configured to recognize that the bridge apparatus 120 is emulating an NFC card but the portable device 140 is actually a contact IC card. The contact protocol indicator may be embedded in the NFC card initialization process involving commands (e.g., wake-up type B (WUPB)) and responses (e.g., answer to select (ATS)) to establish the communication parameters.

At step S3, after the contact protocol indicator has been encoded into the contactless protocol (e.g., ISO 14443 format), the modulator/demodulator 520 may modulate the encoded indicator for the bridge apparatus NFC antenna 130 to transmit as a wireless signal.

At step S4, after receiving the modulated and encoded contact protocol indicator, the user device 102 may demodulate and decode the contact protocol indicator. Based on the contact protocol indicator, the interaction application of the user device 102 may prepare a set of contact interaction messages (e.g., contact APDU commands) instead of contactless interaction messages (e.g., contactless APDU command) for interaction with the portable device 140. Further details describing the contact interaction messages and corresponding transaction flow are described below in FIG. 6.

At step S5, the user device 102 may encode a contact interaction command message (e.g., contact APDU command) to form an encoded signal in contactless protocol (e.g., ISO 14443 format), and then modulate the encoded signal using ASK onto a radio frequency (RF) carrier for the user device NFC antenna 104 to transmit.

At step S6, the bridge apparatus NFC antenna 130 may receive the ASK-modulated RF carrier of the encoded signal (i.e., contact interaction message in the contactless protocol) from the user device 102. At step S7, the modulator/demodulator 520 may demodulate the ASK-modulated RF carrier to extract the encoded signal to obtain the contact interaction command message in the contactless protocol.

In some embodiments, after receiving the contact interaction command message from the user device 102, the controller 530 of the bridge apparatus 120 may track the time the bridge apparatus 120 may take to respond to the received command message. The time it takes to respond may include the controller (530) processing time, the contact interface (136) processing time, and the portable device (140) response time. Since a timing requirement (called frame delay time) exists between an interaction command message (e.g., APDU command) and its corresponding response (e.g., APDU response) in contactless protocol, the controller 530 may initiate a contactless wait time extension (e.g., SWTX) request to the user device 102 via the bridge apparatus NFC antenna 130 if necessary. This request may repeat until a proper response (e.g., an interaction response message) (discussed below) is sent by the bridge apparatus 120 to the user device 102.

At step S8, the clock recovery and distribution module 540 may extract timing information from the wireless signal (i.e., ASK-modulated RF carrier) and track received data counts. At step S9, the clock recovery and distribution module 540 may provide the timing information and tracked data counts to the encoder/decoder 532.

At step S10, the encoder/decoder 532 may perform protocol conversion by decoding the contact interaction command message (e.g., contact APDU command) in the contactless protocol (e.g., ISO 14443 format), and encoding the interaction command message into the contact protocol (e.g., ISO 7816 format).

At step S11, the parallel/serial communication interface 550 (e.g., Tx FIFO 556, UART 552, and interface 558) may convert data (i.e., contact interaction command message in the contact protocol) in parallel form into serial form that may involve character modulation, and send the serial data to the contact interface 136. At step S12, the contact interface 136 can send the received data to the portable device 140.

At step S13, after processing the interaction command message, the portable device 140 may generate a corresponding contact interaction response message (e.g., contact APDU response), and send it to the contact interface 136 of the bridge apparatus 120. At step S14, the contact interface 136 may transmit serial data (i.e., contact APDU response) in the contact protocol (e.g., ISO 7816 format) to the parallel/serial communication interface 550.

At step S15, the parallel/serial communication interface 550 (e.g., interface 558, UART 552, and Rx FIFO 554) may convert the data (i.e., contact interaction response message in the contact protocol) in serial form into parallel form that may involve character demodulation, and send the parallel data to the controller 530.

At step S16, the encoder/decoder 532 may perform protocol conversion by decoding the contact interaction response message (e.g., contact APDU response) in contact protocol (e.g., ISO 7816 format), and encoding the contact interaction response message into contactless protocol (e.g., ISO 14443 format).

At step S17, the modulator/demodulator 520 may modulate the encoded interaction response message using BPSK onto a radio frequency (RF) carrier for the bridge apparatus NFC antenna 130 to transmit.

At step S18, after receiving the BPSK-modulated RF carrier of the encoded signal (i.e., contact interaction response message into contactless protocol), the user device 102 may demodulate the signal to extract the contact interaction response message for the interaction application to process the response payload.

Steps S5 to S18 may repeat for each contact interaction command-response pair in the set of contact interaction messages prepared by the interaction application of the user device 102 at step S4. Further details describing the contact interaction messages and corresponding transaction flow are described below in FIG. 6.

At step S19, when the portable device is removed from the receiving end 138 (e.g., a card slot) of the contact interface 136 (e.g., a contact card reader), the trigger switch 514 for card insert detection may be released. As a result, the controller 530 may be notified to stop the NFC card emulation.

Figure 6:
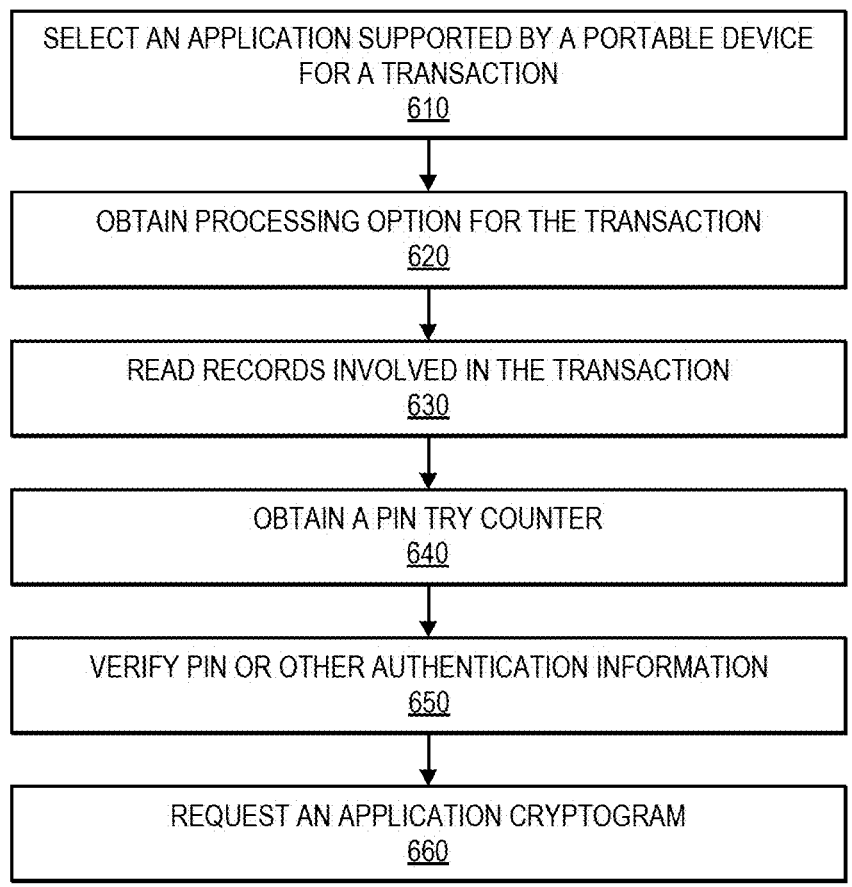
FIG. 6 is a flowchart illustrating an Europay, Mastercard, and Visa (EMV) transaction flow for contact application protocol data unit (APDU) messages, according to certain embodiments.

FIG. 6 is a flowchart illustrating a Europay, Mastercard, and Visa (EMV) transaction flow for contact interaction messages (e.g., application protocol data unit (APDU) messages), according to certain embodiments. For example, contact interaction messages may include a contact APDU command and response pair in each step of the transaction flow.

At step 610, an application supported by a portable device for a transaction is selected. A transaction may start by selecting the desired application, which should be supported by both the portable device 140 and the user device 102 (e.g., smart card reader or terminal). For example, the user device 102 may issue an interaction command message (e.g., contact APDU SELECT command) for this purpose, identified by CLA=0x00 and INS=0xA4. In some embodiments, there may be two ways to select an application: select by name using 1PAY.SYS.DDF01, or select by Application Identifier (AID). The portable device 140 may respond with file control information (FCI).

At step 620, a processing option for the transaction may be obtained. This step may enable the user device 102 to understand the capabilities and parameters of the portable device 140. For example, the user device 102 may issue a GET PROCESSING OPTS command (CLA=0x80, INS=0xA8), and the user device 102 may respond with the Application Interchange Profile (AIP) and Application File Locator (AFL). The AIP may contain information about the type of authentication supported, while the AFL may inform the user device 102 which records (list of objects) can be read from the portable device 140 to perform the transaction.

At step 630, data records involved in the transaction may be read. For example, the user device 102 may issue a READ RECORD command to read the records specified in the AFL. The portable device 140 may respond with the data records, such as the Card Risk Management Data Object List 1 (CDOL1) and the Cardholder Verification Method (CVM) List. The CDOL1 specifies which data should be included in a GENERATE AC command (described below), while the CVM list enumerates the methods that can be used to authenticate the user of the portable device 140, for example, PIN or signature.

At step 640, a PIN try counter may be obtained. The user device 102 may issue a GET DATA command (CLA=0x80, INS=0xCA) to obtain the PIN try counter. The PIN try counter may represent the number of trials the user of the portable device 140 can correctly enter the PIN before the portable device 140 becomes locked (it can then be unlocked by the issuer bank). If the counter is greater than zero the user may be asked to enter the PIN number into the numerical pad of the user device 102. At this point, the user device 102 can either verify the PIN online by requesting confirmation to the issuer bank, or ask the portable device 140 (online) for confirmation.

At step 650, the PIN or other authentication information may be verified. The user device 102 may issue a VERIFY command (CLA=0x00, INS=0x20) to the portable device 140 with plain text PIN as the command data. If the PIN is correct, the portable device 140 may reply with a success status (SW1=0x90, SW2=0x00).

At step 660, an application cryptogram may be requested. For example, user device 102 may issue a GENERATE AC command (CLA=0x80, INS=0xAE). This request may be for an Application Authentication Cryptogram (AAC), which requests canceling a transaction, an Authorization Request Cryptogram (ARQC), which requests an online transaction (i.e., confirmation from issuer bank), or a Transaction Certificate (TC), which requests an offline transaction (i.e., no confirmation from the issuer bank). The portable device 140 may use its private key (only known by the portable device 140 and the issuer bank) to compute a Message Authentication Code (MAC) over a set of bytes that include the data sent with the GENERATE AC command. If the portable device 140 accepts the transaction, it may return a MAC of the same type (AAC, ARQC or TC) or at a lower level (where AAC=level 1, ARQC-level 2 and TC=level 3). If the portable device 140 decides to reject the transaction, it may return a MAC of type AAC.

Figure 7:
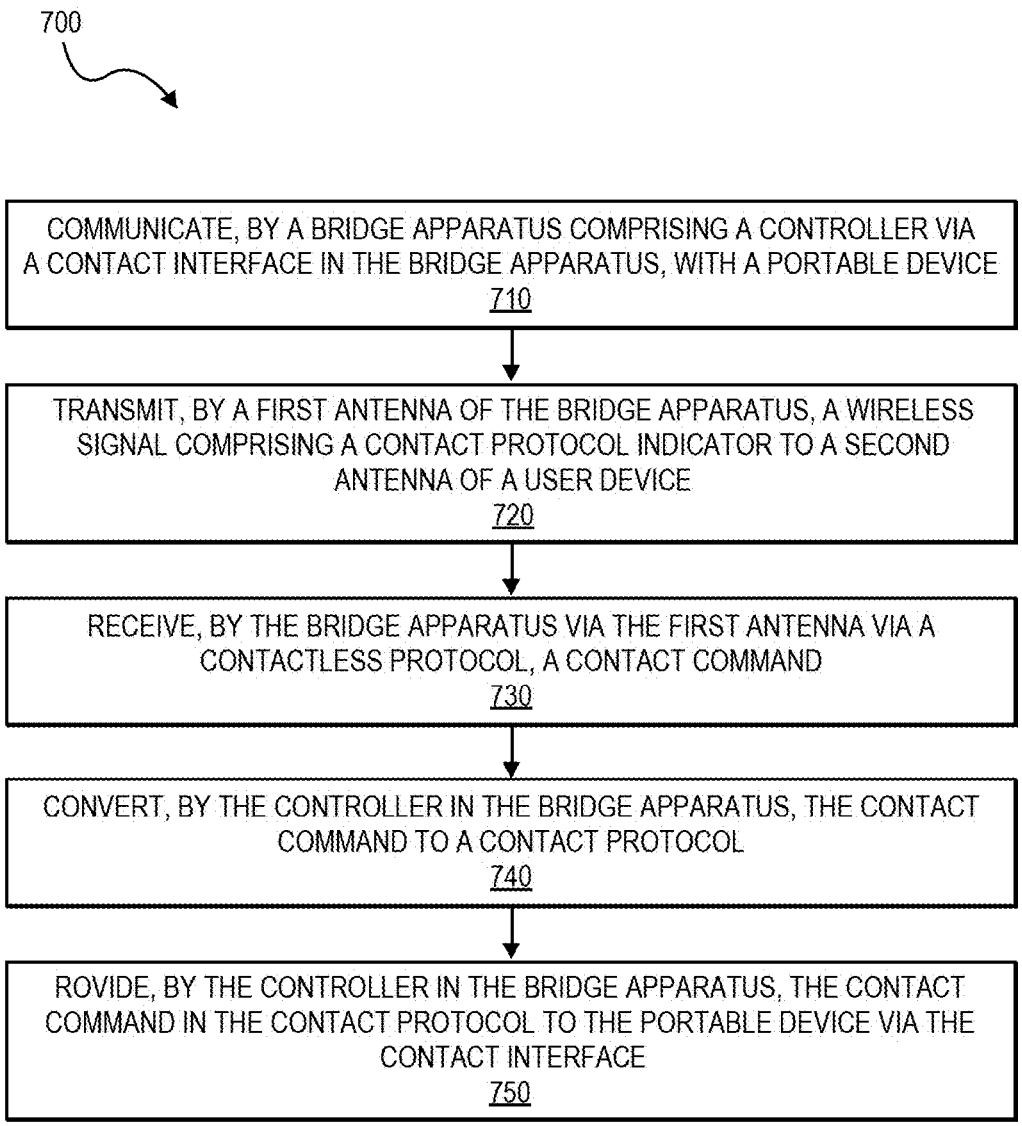
FIG. 7 is a flowchart illustrating a method for communication between a user device and a portable device via a bridge apparatus, according to certain embodiments.

FIG. 7 is a flowchart illustrating a method for communication between a user device and a portable device via a bridge apparatus, according to certain embodiments. The method presented in FIG. 7 and described below is intended to be illustrative and non-limiting. Although FIG. 7 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 7 may include a greater number or a lesser number of steps than those depicted in FIG. 7.

At step 710, a bridge apparatus comprising a controller may communicate, via a contact interface in the bridge apparatus, with a portable device. For example, in FIG. 5, a controller 530 in the bridge apparatus 120 can communicate with a portable device 140 (e.g., a contact IC card) through a contact interface 136 (e.g., a contact IC card reader), which is part of the bridge apparatus 120. The communication between the controller 530 and the portable device 140 may involve signal conversion, such as parallel/serial data conversion, character modulation (e.g., ISO 7816 standard), etc.

At step 720, a wireless signal comprising a contact protocol indicator may be transmitted by a first antenna of the bridge apparatus to a second antenna of a user device. For example, in FIGS. 1 and 5, during the NFC card initialization process, the controller 530, at step S2, may generate and send a contact protocol indicator to the user device 102, indicating that the bridge apparatus 120 may be performing a contactless-to-contact protocol conversion for the portable device 140 that is capable for contact transaction only. The contact protocol indicator may be an indicator for the interaction application of the user device 102 to recognize that the bridge apparatus 120 is performing an NFC card emulation. The contact protocol indicator may be encoded into contactless protocol (e.g., ISO 14443 format) and modulated for the bridge apparatus NFC antenna 130 (or the first antenna) to transmit as a wireless signal to the user device NFC antenna 104 (or the second antenna).

At step 730, a contact command in a contactless protocol may be received by the bridge apparatus via the first antenna. For example, in FIGS. 1 and 5 (e.g., at steps S4 and S5), after receiving the contact protocol indicator, the interaction application of the user device 102 may generate and send a contact interaction command message (e.g., contact APDU SELECT command discussed in relation to FIG. 6). The contact interaction command may be encoded into the contactless protocol (e.g., ISO 14443 format) and modulated for the user device NFC antenna 104 to transmit as a wireless signal to the bridge apparatus NFC antenna 130.

At step 740, the contact command may be converted from the contactless protocol to a contact protocol by the controller in the bridge apparatus. For example, in FIG. 5 (e.g., at step S10), the contact interaction command in contactless protocol received by the bridge apparatus 120 may be demodulated by modulator/demodulator 520 and decoded by a decoder of the encoder/decoder module 532 in the controller 530. The same contact interaction command can then be encoded, by an encoder of the encoder/decoder module 532, into a contact protocol (e.g., ISO 7816 format).

At step 750, the contact command in the contact protocol may be provided by the controller in the bridge apparatus to the portable device via the contact interface. For example, in FIG. 5 (e.g., at step S11), the contact interaction command in the contact protocol may be sent by the controller 530 to the contact interface 136 (e.g., contact IC card reader) through the parallel/serial communication interface 550, performing data (e.g., electrical signals) conversion (from parallel data to serial data). The contact interface 136 can, in turn, send the contact interaction command to the portable device 140.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method, comprising:
   communicating, by a bridge apparatus comprising a controller via a contact interface in the bridge apparatus, with a portable device;
   transmitting, by a first antenna of the bridge apparatus, a wireless signal comprising a contact protocol indicator to a second antenna of a user device;
   receiving, by the bridge apparatus via the first antenna, a contact command in a contactless protocol;
   converting, by the controller in the bridge apparatus, the contact command to a contact protocol; and
   providing, by the controller in the bridge apparatus, the contact command in the contact protocol to the portable device via the contact interface, wherein the method further comprises:
   receiving, by the bridge apparatus via the contact interface in the bridge apparatus, a contact response in the contact protocol from the portable device;
   converting, by the controller in the bridge apparatus, the contact response to the contactless protocol; and
   transmitting, by the first antenna of the bridge apparatus, the contact response in contactless protocol to the second antenna of the user device.

2. The method of claim 1, further comprising performing, by the controller, a near-field communication (NFC) card emulation.

3. The method of claim 1, wherein the user device is configured to generate the contact command based on the contact protocol indicator.

4. The method of claim 3, wherein the contact protocol indicator is a code which notifies the user device that the portable device is a contact integrated circuit (IC) card.

5. The method of claim 1, wherein the contact command is an application protocol data unit (APDU) command.

6. The method of claim 1, wherein the user device is a phone and the portable device is a contact IC card.

7. The method of claim 1, wherein the contact protocol is a protocol in compliance with international organization for standardization (ISO)/international electrotechnical commission (IEC) 7816 standard.

8. The method of claim 1, wherein the contactless protocol is a protocol in compliance with ISO/IEC 14443 standard.

9. The method of claim 1, wherein the contact interface is a contact card reader.

10. The method of claim 1, wherein the first antenna and the second antenna are NFC antennas, and the wireless signal is an NFC signal.

11. The method of claim 1, wherein the contact response is an application protocol data unit (APDU) response.

12. The method of claim 1 wherein the portable device is a credit card or a debit card.

13. The method of claim 12, wherein the user device is a mobile phone.

14. A bridge apparatus, comprising:
a first antenna;
a contact interface;
a controller electrically coupling the first antenna and the contact interface, wherein the bridge apparatus is configured to perform operations comprising:
communicating, by the controller via the contact interface, with a portable device;
transmitting, by the first antenna, a wireless signal comprising a contact protocol indicator to a second antenna of a user device;
receiving, by the controller via the first antenna via a contactless protocol, a contact command;
converting, by the controller, the contact command to a contact protocol; and
providing, by the controller, the contact command in the contact protocol to the portable device via the contact interface,
wherein the operations further comprise:
receiving, by the bridge apparatus via the contact interface in the bridge apparatus, a contact response in the contact protocol from the portable device;
converting, by the controller in the bridge apparatus, the contact response to the contactless protocol; and
transmitting, by the first antenna of the bridge apparatus, the contact response in contactless protocol to the second antenna of the user device.

15. The bridge apparatus of claim 14, wherein the first antenna and the second antenna are near-field communication (NFC) antennas.

16. The bridge apparatus of claim 14, wherein the contact interface is a contact card reader.

17. The bridge apparatus of claim 14, wherein the contact command is an application protocol data unit (APDU) command, the contact protocol is a protocol in compliance with international organization for standardization (ISO)/international electrotechnical commission (IEC) 7816 standard, and the contactless protocol is a protocol in compliance with ISO/IEC 14443 standard.

18. A system, comprising:
a bridge apparatus, comprising a first antenna, a controller, and a contact interface;
a user device, comprising a processor, and a second antenna; and
a portable device;
wherein the bridge apparatus is configured to perform operations comprising:
communicating, by the controller via the contact interface, with the portable device;
transmitting, by the first antenna, a wireless signal comprising a contact protocol indicator to the second antenna of the user device;
receiving, by the controller via the first antenna via a contactless protocol, a contact command;
converting, by the controller, the contact command to a contact protocol; and
providing, by the controller, the contact command in the contact protocol to the portable device via the contact interface,
wherein the bridge apparatus is also configured to perform operations comprising:
receiving, by the controller via the contact interface, a contact response in the contact protocol from the portable device;
converting, by the controller, the contact response to the contactless protocol; and
transmitting, by the first antenna of the bridge apparatus, the contact response in contactless protocol to the second antenna of the user device.

19. The system of claim 18, wherein the user device is a phone and the portable device is a contact IC card.

20. The system of claim 18, wherein the contact command is an application protocol data unit (APDU) command, the contact protocol is a protocol in compliance with international organization for standardization (ISO)/international electrotechnical commission (IEC) 7816 standard, and the contactless protocol is a protocol in compliance with ISO/IEC 14443 standard.

* * * * *